United States Patent [19]
Yue

[11] Patent Number: 5,566,030
[45] Date of Patent: Oct. 15, 1996

[54] ADJUSTABLE MIRROR SUPPORT

[76] Inventor: Chin-Chuan Yue, 58, Ma Yuan West St., Taichung, Taiwan

[21] Appl. No.: 535,331

[22] Filed: Sep. 27, 1995

[51] Int. Cl.[6] .............................. A47G 1/24; G02B 7/182; B60R 1/04
[52] U.S. Cl. .......................... 359/872; 359/881; 248/467; 248/477; 248/484; 248/485; 40/593; 40/597; 40/611; 40/152.1
[58] Field of Search ..................................... 359/872, 876, 359/881; 248/467, 477, 479, 481, 484, 485, 486; 40/591, 592, 593, 597, 611, 152.1, 156, 159

[56] References Cited

U.S. PATENT DOCUMENTS

| | | | |
|---|---|---|---|
| 1,006,315 | 10/1911 | Toth | 248/467 |
| 1,079,414 | 11/1913 | Jirka | 248/484 |
| 1,932,697 | 10/1933 | Jankoviuc | 248/484 |
| 2,904,290 | 9/1959 | Mullen et al. | 248/477 |
| 4,614,412 | 9/1986 | Cohen | 359/872 |
| 4,624,539 | 11/1986 | King et al. | 248/467 |
| 4,925,287 | 5/1990 | Lord et al. | 248/467 |
| 5,229,888 | 7/1993 | Gustafsson et al. | 248/467 |

*Primary Examiner*—Ricky D. Shafer

[57] ABSTRACT

A multi-stage adjustable mirror support in a car has a sucker covered by a sucker cover and a post on the sucker. The post passes through the sucker cover. A press body which is on the sucker cover connects the post pivitedly. The front of the sucker cover receives a gear seat. The gear seat has a chamber to receive a gear, a hole and a recess. A lower link has two parallel side plates to receive the front of the sucker cover. The upper end of the lower link receives the lower end of the middle link pivitedly. An upper link has two parallel side plates to receive the upper end of the middle link pivitedly. The interspace between the upper ends of the spaced side plates receives two arms of a swivel. The swivel has a ball end and two parallel arms. Each arm has a central hole. The interspace between two parallel arms receives a gear seat. The gear seat has a chamber to receive a gear, a hole and a recess. The upper link, the gear seat and the swivel are connected pivotedly.

2 Claims, 6 Drawing Sheets

5,566,030

ADJUSTABLE MIRROR SUPPORT

BACKGROUND OF THE INVENTION

The invention relates to a mirror support for a mirror of a car. More particularly, the invention relates to an adjustable mirror support for a mirror inside a car.

A conventional mirror inside a car is always disposed at the front upper direction of the driver. The passengers who sit at the rear seat cannot use the mirror at all.

SUMMARY OF THE INVENTION

An object of the invention is to provide a multi-stage mirror support which can be positioned under the roof of a car and adjusted in multi-stage.

Another object of the invention is to provide a multi-stage mirror support which can be positioned on a rear door window of a car and adjusted in multi-stage.

Another object of the invention is to provide an adjustable mirror support which can be converted to be a photograph holder.

Accordingly, a multi-stage adjustable mirror support comprises a sucker covered by a sucker cover and a central post disposed on the top of the sucker. The central post with a hole passes through the rectangular hole of the sucker cover. A press body is disposed on the top of the sucker cover. The press body has a press plate and two parallel pivot lugs extending from the press plate. The interspace between two parallel pivot lugs receives the upper end of the central post. The central post and the pivot lugs are connected pivotedly. The sucker cover has two parallel spaced lobes disposed in the front of the sucker cover. The interspace between two lobes receives a first gear seat. The first gear seat has a first chamber to receive a first gear, a first hole and a first recess crossing the first hole. A lower link has two parallel spaced side plates and a positioning plate crossing the side plates. Each side plate has an upper and a lower positioning holes. The interspace between the lower ends of the spaced side plates receives the upper ends of two lobes. The lobes, the first gear seat and the spaced side plates are connected pivotedly. A middle link has two parallel spaced lateral plates. Each lateral plate has an upper and a lower circular holes. The interspace between the upper ends of the spaced side plates receive the lower ends of the lateral plates. The interspace between the lower ends of the spaced lateral plates receives a second gear seat. The second gear seat has a second chamber to receive a second gear, a second hole and a second recess crossing the second hole. The lateral plates, the second gear seat and the spaced side plates are connected pivotedly. The interspace between the upper ends of the spaced lateral plates receive a third gear seat. The third gear seat has a third chamber to receive a third gear, a third hole and a recess crossing the third hole. An upper link has two parallel spaced side plates and a positioning plate crossing the side plates. Each side plate has an upper and a lower positioning holes. The interspace between the lower ends of the spaced side plates receive the upper ends of two lateral plates. The upper link, the third gear seat and the spaced lateral plates are connected pivotedly. The interspace between the upper ends of the spaced side plates receives two arms of a swivel. The swivel has a ball end and two parallel arms. Each arm has a central hole. The interspace between two parallel arms receives a fourth gear seat. The fourth gear seat has a fourth chamber to receive a fourth gear, a fourth hole and a fourth recess crossing the fourth hole. The upper link, the gear seat and the swivel are connected pivoted by.

DETAILED DESCRIPTION OF THE INVENTION

Figure 1:
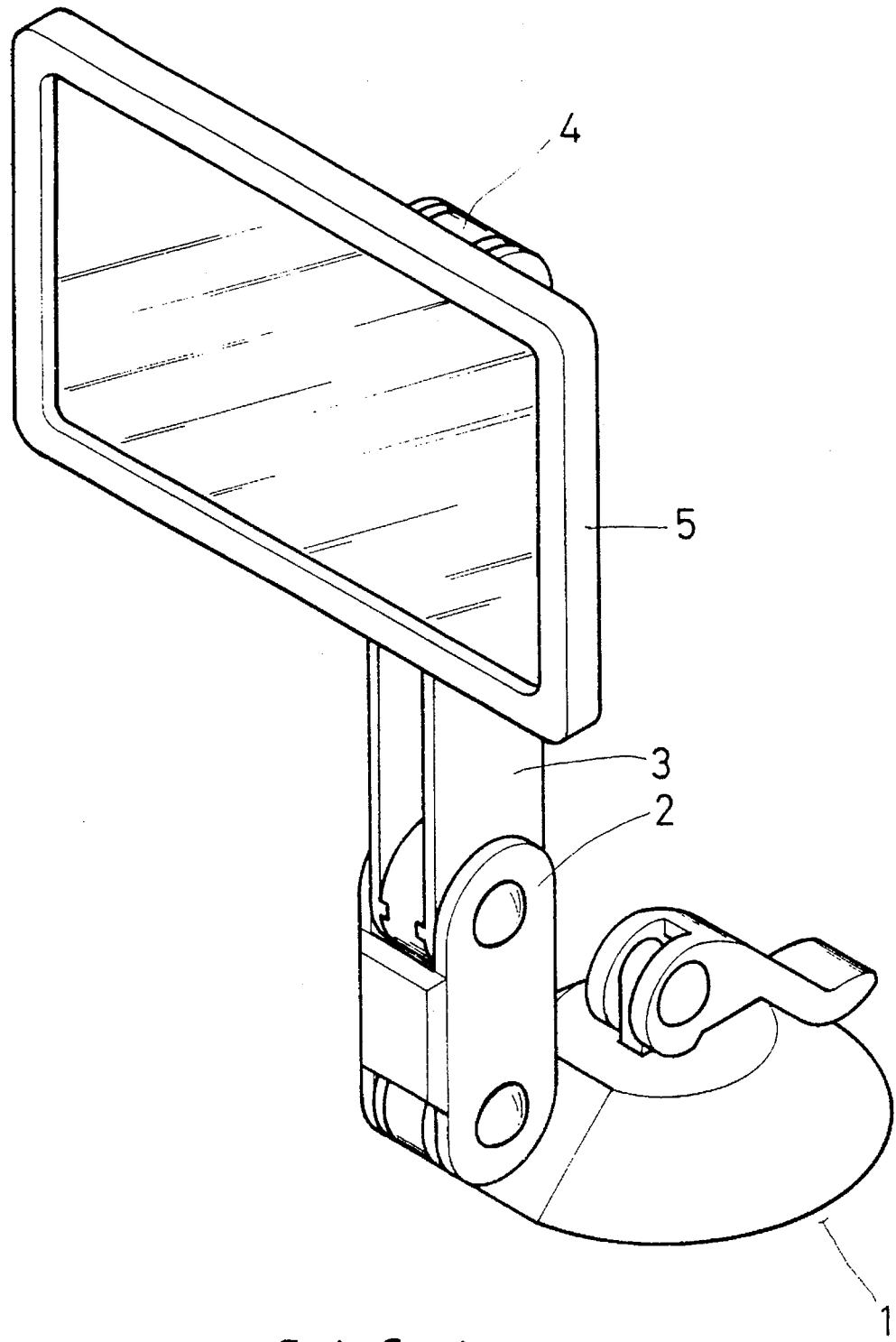
FIG. 1 is a perspective view of a rectangular mirror and a mirror support.
Figure 2:
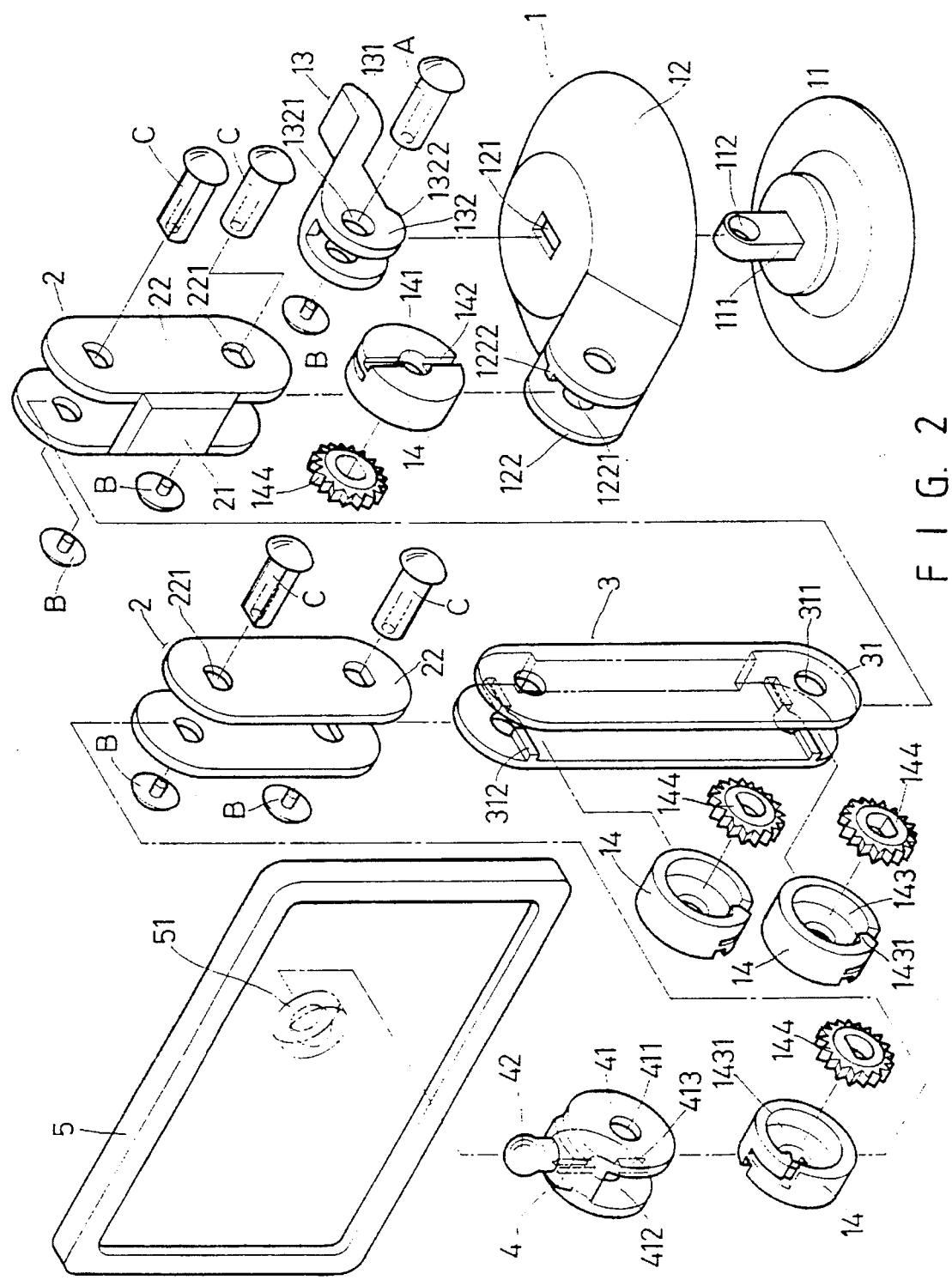
FIG. 2 is a perspective exploded view of FIG. 1.
Figure 3:
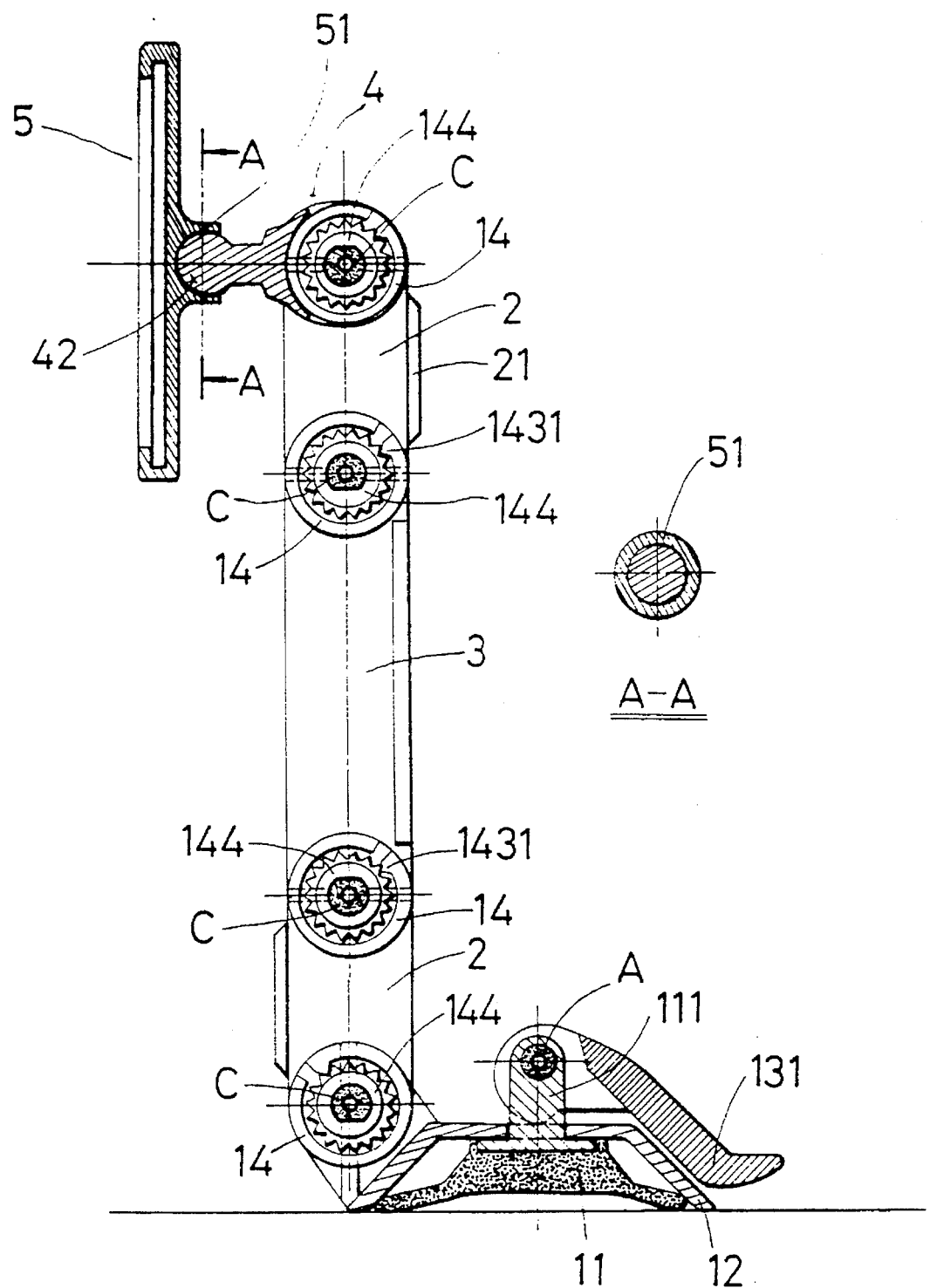
FIG. 3 is a cross-sectional view of FIG. 1.

Referring to FIG. 1, a rectangular mirror 5 is disposed on a mirror support 1. A hollow cylindrical socket 51 is disposed at the back of the rectangular mirror 5. Referring to FIGS. 2 and 3, the mirror support 1 has a sucker 11 covered by a sucker cover 12. A press body 13 is disposed on the top of the sucker cover 12. A link unit is disposed in the front of the sucker cover 12. A central post 111 which has a round hole 112 is disposed on the top of the sucker 11. The sucker cover 12 has a rectangular hole 121 on its top and two parallel spaced lobes 122 disposed in the front of the sucker cover 12. Each lobe 122 has a through hole 1221. An inner rib 1222 is disposed at an inner surface one lobe 122. The interspace between two lobes 122 receives a first gear seat 14. The first gear seat 14 has a chamber 143 to receive a first gear 144, a hole 141 and a recess 142 crossing the hole 141. A lower link 2 has two parallel spaced side plates 22 and a positioning plate 21 crossing the side plates 22. Each side plate 22 has an upper and a lower positioning holes 221. The interspace between the lower ends of the spaced side plates 22 receive the upper ends of two lobes 122. The lobes 122, the gear seat 14 and the spaced side plates 22 are connected by a positioning pin C and a corresponding fastening button B. A middle link 3 has two parallel spaced lateral plates 31. Each lateral plate 31 has an upper and a lower circular holes 311. The interspace between the upper ends of the spaced side plates 22 receive the lower ends of the lateral plates 31. Each of the two opposite ends of the lateral plates 31 has a transverse rib 312 to position a gear seat 14. The interspace between the lower ends of the spaced lateral plates 31 receive a second gear seat 14. The second gear seal 14 has a chamber 143 to receive a second gear 144, a hole 141 and a recess 142 crossing the hole 141. The lateral plates 31, the gear seat 14 and the spaced side plates 22 are connected by a positioning pin C and a corresponding fastening button B. The interspace between the upper ends of the spaced lateral plates 31 receive a third gear seat. 14. The third gear seat 14 has a chamber 143 to receive a third gear 144, a hole 141, a projection 1431, and a recess 142 crossing the hole 141. An upper link 2 has two parallel spaced side plates 22 and a positioning plate 21 crossing the side plates 22. Each side plate 22 has an upper and a lower positioning holes 221. The interspace between the lower ends of the spaced side plates 22 receive the upper ends of two lateral plates 31. The upper link the gear seat 14 and the spaced lateral plates 31 are connected by a positioning pin C and a corresponding fastening button B. The interspace between the upper ends of the spaced side plates 22 receive two arms of a swivel 4. The swivel 4 has a ball end 42 at top and two parallel arms 412. Each arm 412 has a central hole 411. A longitudinal rib 413 is disposed in one arm 412. The interspace between two parallel arms 412 receive a fourth gear seat 14. The fourth gear seat 14 has a chamber 143 to receive a fourth gear 144, a hole 141 and a recess 142 crossing the hole 141. The upper link 2, the gear seat 14 and the swivel 4 are connected by a positioning pin C and a corresponding fastening button B. The ball end 42 is inserted in the socket 51. The central post 111 with a hole 112 passes through the rectangular hole 121. A press body 13 has a press plate 131 and two parallel pivot lugs 132 extending from the press plate 131. The interspace 412 between two parallel pivot lugs 132 receives the upper end of the central post 113. The central post 111 and the pivot lugs 132 are connected by a pivot rod A which extends through 1321 and a corresponding fastening button B. When the press plate 131 is pressed down, the sucker 11 can be adsorbed on any flat surface.

Figure 4:
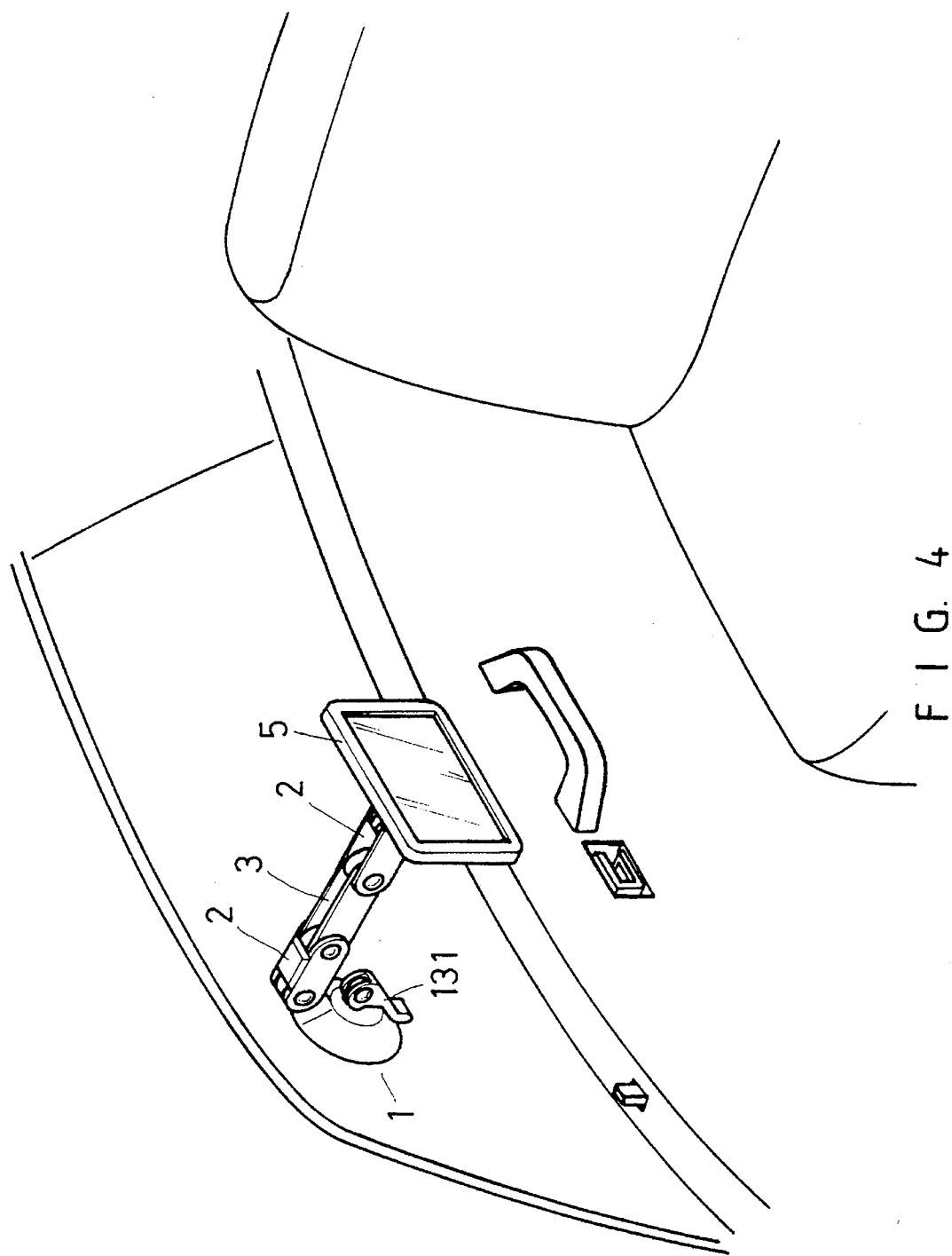
FIG. 4 is a schematic view illustrating the application of a mirror support on a rear door window of a car.
Figure 6:
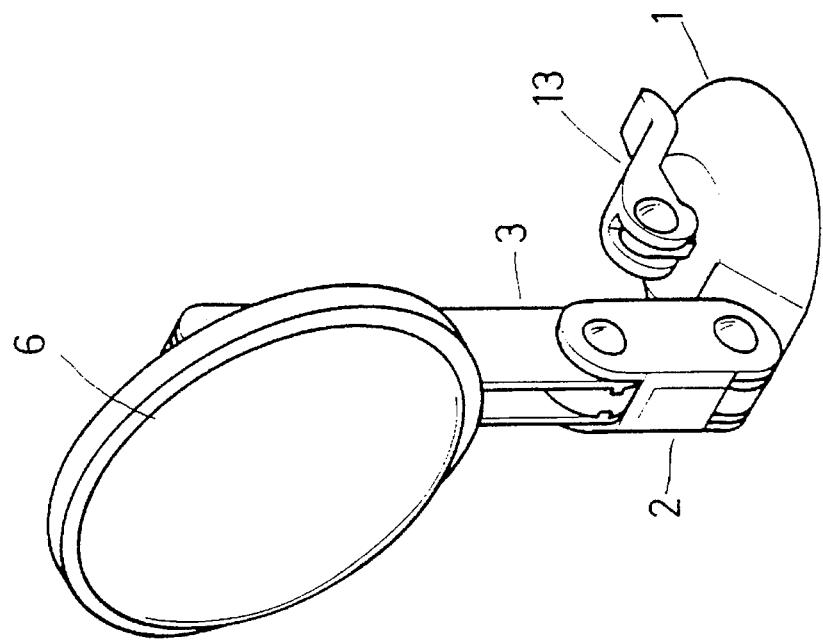
FIG. 6 is a perspective view of a round mirror and a mirror support.
Figure 5:
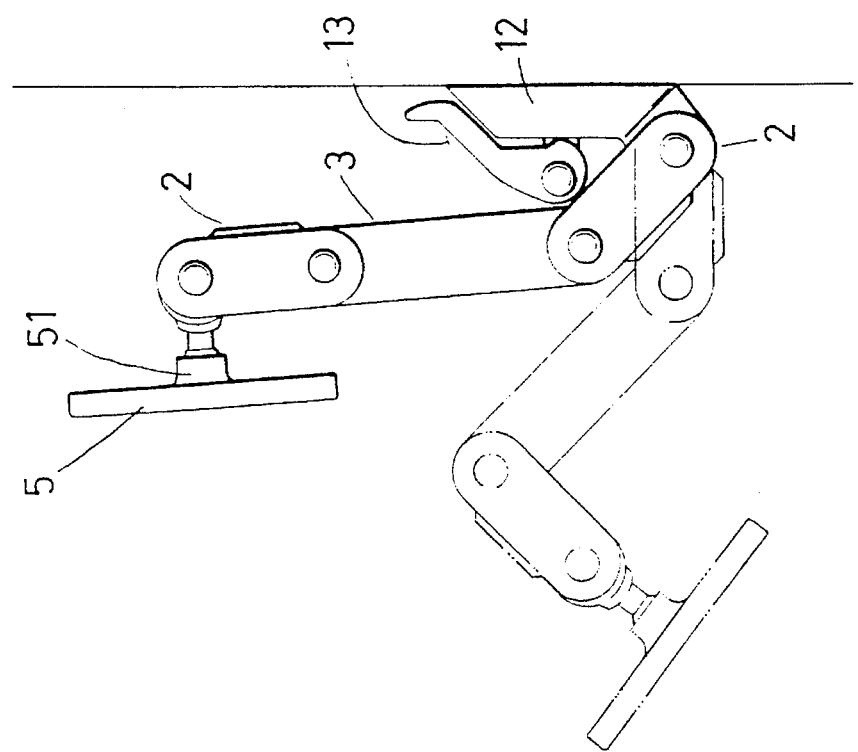
FIG. 5 is a schematic view illustrating the adjustment of a mirror support.

FIG. 4 is a schematic view illustrating the application of a mirror support on a rear door window of a car. FIG. 5 is a schematic view illustrating the adjustment of a mirror support. FIG. 6 is a perspective view of a round mirror and a mirror support.

Figure 8:
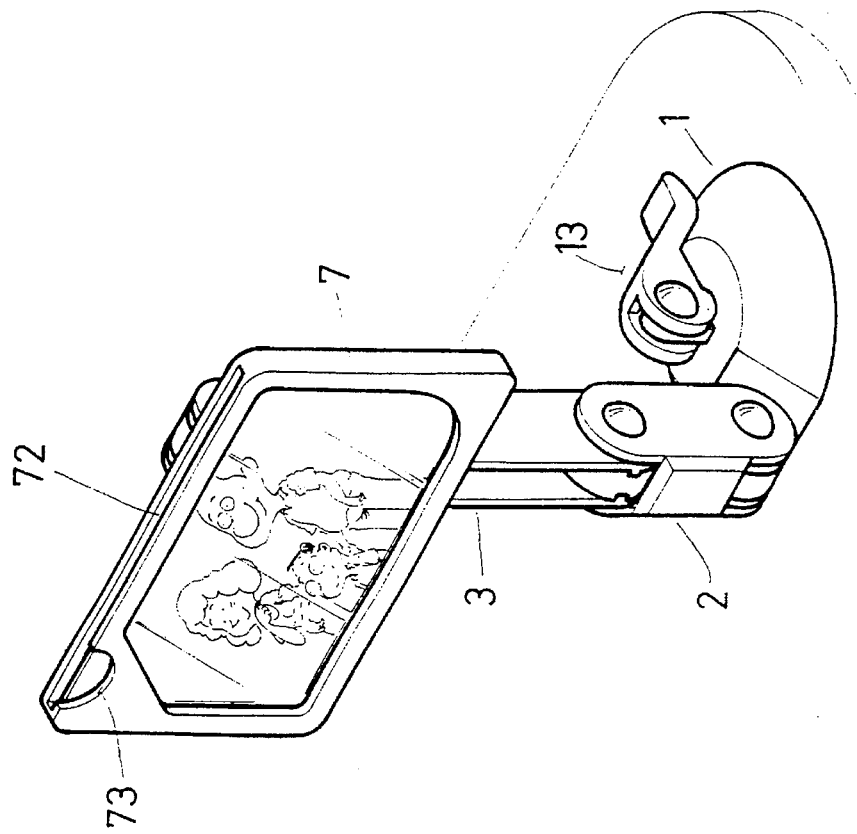
FIG. 8 is a schematic view illustrating the combination of a transparent film and a container on a mirror support.
Figure 7:
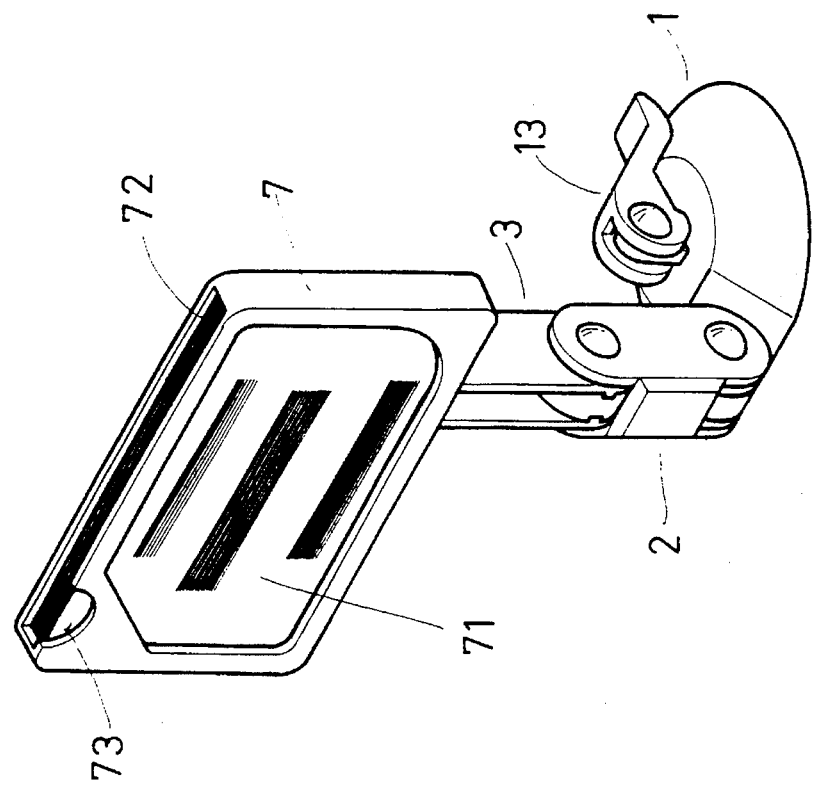
FIG. 7 is a perspective view of a container and a mirror support.

FIG. 7 is a perspective view of a container and a mirror support. A container 7 has a front window 71, an upper opening 72 and a slot 73 at the upper edge of the container 7. As shown in FIG. 8, a transparent film is disposed in the front of the container.

The invention is not limited to the above embodiment but various modification thereof may be made. Further, various changes in form and detail may be made without departing from the spirit and scope of the invention.

I claim:

1. A multi-stage adjustable mirror support comprising:

a sucker covered by a sucker cover, and a central post disposed on the top of said sucker;

said central post with a hole passing through a rectangular hole of said sucker cover;

a press body disposed on the top of said sucker cover;

said press body having a press plate and two parallel pivot lugs extending from said press plate;

an interspace between said parallel pivot lugs receiving an upper end of said central post;

said central post and said pivot lugs connected pivotedly by a fastener means;

said sucker cover having two parallel spaced lobes disposed in the front of said sucker cover;

an interspace between said parallel lobes receiving a first gear seat, said first gear seat having a first chamber to receive a first gear, a first hole and a first recess crossing said first hole;

a lower link having two parallel spaced side plates and a positioning plate crossing said side plates;

each of said side plate having an upper and a lower positioning holes:

an interspace between lower ends of said spaced side plates receiving upper ends of said lobes;

said lobes, said first gear seat and said spaced side plates connected pivotedly by a fastener means;

a middle link having two parallel spaced lateral plates, each of said lateral plate having an upper and a lower circular holes;

an interspace between upper ends of said spaced side plates receiving lower ends of said lateral plates;

an interspace between lower ends of said spaced lateral plates receiving a second gear seat;

said second gear seat having a second chamber to receive a second gear, a second hole and a second recess crossing said second hole;

said lateral plates, said second gear seat and said spaced side plates connected pivotedly by a fastener means;

an interspace between upper ends of said spaced lateral plates receiving a third gear seat;

said third gear seat having a third chamber to receive a third gear, a third hole and a third recess crossing said third hole;

an upper link having two parallel spaced side plates and a positioning plate crossing said side plates;

each of said side plate having an upper and a lower positioning holes;

an interspace between lower ends of said spaced side plates receiving upper ends of said lateral plates;

said upper link, said third gear seat and said spaced lateral plates connected pivotedly by a fastener means;

an interspace between upper ends of said spaced side plates receiving two arms of a swivel, said swivel having a ball end and two parallel arms;

each of said arm having a central hole;

an interspace between said parallel arms receiving a fourth gear seat;

said fourth gear seat having a fourth chamber to receive a fourth gear, a fourth hole and a fourth recess crossing said fourth hole;

said upper link, said gear seat and said swivel connected pivotedly by a fastener means.

2. A multi-state adjustable mirror support as claimed in claim 1, wherein said fastener means includes a pin and a corresponding fastening button.

* * * * *